UNITED STATES PATENT OFFICE.

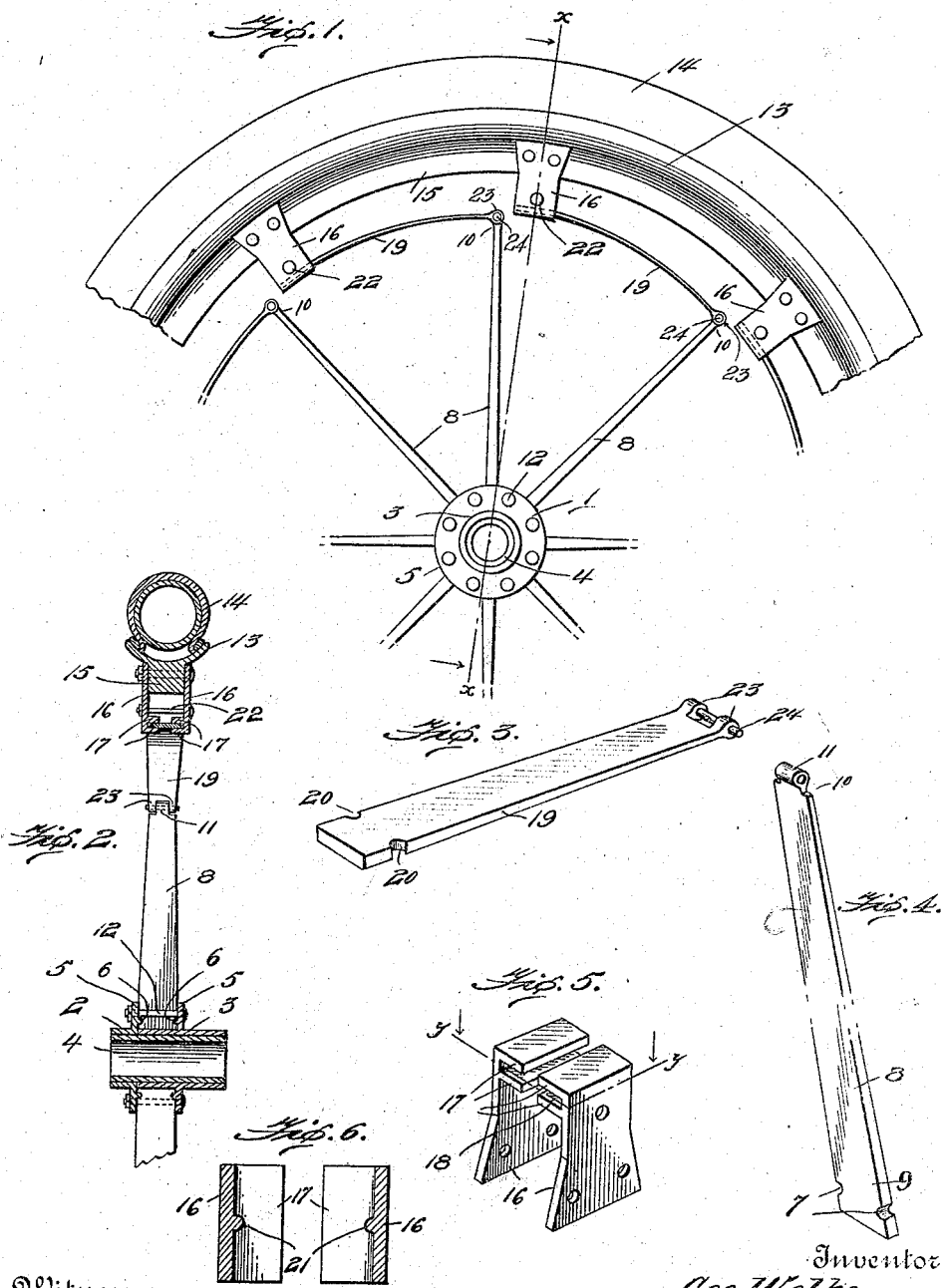

GEORGE WOLKE, OF JACKSONVILLE, ILLINOIS.

WHEEL.

No. 899,934.

Specification of Letters Patent.

Patented Sept. 29, 1908.

Application filed February 17, 1908. Serial No. 416,401.

*To all whom it may concern:*

Be it known that I, GEORGE WOLKE, a citizen of the United States, residing at Jacksonville, in the county of Morgan and State of Illinois, have invented certain new and useful Improvements in Wheels; and I do declare the following to be a full, clear, and exact description of the invention, such as will enable others skilled in the art to which it appertains to make and use the same.

My invention relates to wheels and particularly to spring wheels, and the object of the invention is to provide a wheel wherein shocks received by the tire and rim are taken up by the spokes and associated mechanism so as to relieve the hub and axle of unnecessary jars. This action of course avoids the disagreeable features of riding in vehicles with wheels having rigid spokes.

A further object of the invention is to so construct the parts that lateral strain upon the wheel is equally provided for and resisted the same as in wheels having their spokes connected directly with the rim and hub.

With these and other objects in view, the invention consists of certain novel features of construction, combination and arrangement of parts as will be described and particularly pointed out in the appended claims.

In the accompanying drawings, Figure 1 is a fragmentary side elevation of the wheel partly in section; Fig. 2 is a fragmentary sectional view on line x—x of Fig. 1; Fig. 3 is a detail perspective of the rim spring; Fig. 4 is a perspective view of the spoke; Fig. 5 is a perspective of one of the rim spoke clamps; and Fig. 6 is a transverse sectional view on line y—y of Fig. 5.

Referring more especially to the drawings, 1 represents the hub, which is formed preferably of a pair of rings, 2 and 3, which are centrally apertured to receive the bushing, 4, as is usual. Each one of the rings is provided with an annular flange, 5, having on its inner side, intermediate its width, a circular ridge or lug, 6, which is engaged by notches, 7, formed upon the spokes, 8, which radiate from the hub, as shown. The spokes preferably consist of a flat piece of metal gradually tapering from its base, 9, to its outer end, 10, where it is provided with an integral bearing eye, 11.

All of the spokes are suitably clamped between the flanges of the rings of the hub by bolts, 12, which pass through the flanges between each pair of spokes. The rim 13 of the wheel, may be of any suitable form to receive the tire, 14, but I preferably form it with an annular projection, 15, to which is secured the pairs of clamping members, 16, each comprising a flat plate riveted to the annular projection, 15, and provided at its outer end with inwardly projecting separated flanges, 17, adapted to form a channel-way, 18, for the reception of what I shall term "rim springs" 19. In order to properly secure these springs within the channel-way, 18, I notch them at 20 the same as the spokes, 8, so that they will engage studs, 21, projecting from the sides, 16, into the channel-way between the flanges and pass a securing bolt, 22, through the pair of members so as to clamp them together.

The outer end of the rim spring 19 is provided with a pair of ears, 23, which are apertured to receive a connecting bolt, 24, which passes through the apertured eye, 11. Each one of the springs, 19, extends to a point adjacent the next preceding clamp, 16, where it is connected with the spring spoke, 8, and in practice these rim springs 19 are made perfectly straight, and bent into engagement with the spring spokes.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim as new and desire to secure by Letters-Patent, is:

A vehicle wheel comprising a hub and a felly, a plurality of flat springs spokes carried by the hub, a plurality of pairs of clamping plates secured to the felly and projecting inwardly therefrom, opposing flanges on the clamping plates adapted to form a channelway, and flat springs secured in the channelways formed by the clamping plates and having pivotal connection with the flat spring spokes adjacent the next preceding clamping plate.

In testimony whereof I have hereunto set my hand in presence of two subscribing witnesses.

GEORGE WOLKE.

Witnesses:
F. E. McDOUGALL,
LOLAH E. M. SMITH.